Dec. 26, 1939.                J. L. WOODBRIDGE                2,185,099
                                NONSPILL VENT PLUG
                               Filed Feb. 9, 1938

WITNESS:

INVENTOR
Joseph Lester Woodbridge
BY
Augustus B. Stoughton.
ATTORNEY.

Patented Dec. 26, 1939

2,185,099

UNITED STATES PATENT OFFICE 2,185,099

NONSPILL VENT PLUG

Joseph Lester Woodbridge, Philadelphia, Pa., assignor to The Electric Storage Battery Company, Philadelphia, Pa., a corporation of New Jersey Application February 9, 1938, Serial No. 189,549

1 Claim. (Cl. 251—147)

This vent plug is an improvement, the improvement comprising a modification in the shape of the valve member to provide greater turning moment for this member when the plug is tilted without increasing the diameter of the plug. In the present application, the valve member is bounded by a substantially plane surface constituting its base, a spherical upper surface and a conically shaped annular surface between the base and the upper surface. The center of the upper spherical surface is located in the vertical axis of the valve member at a point slightly below the base, as will be hereinafter explained. This design provides a maximum turning moment to cause the valve member to rock about the periphery of its base and bring its upper spherical surface against the valve seat to close the opening therein when the vent plug is tilted.

The following description taken in connection with the accompanying drawing will fully explain the nature of the invention:

Figure 1:
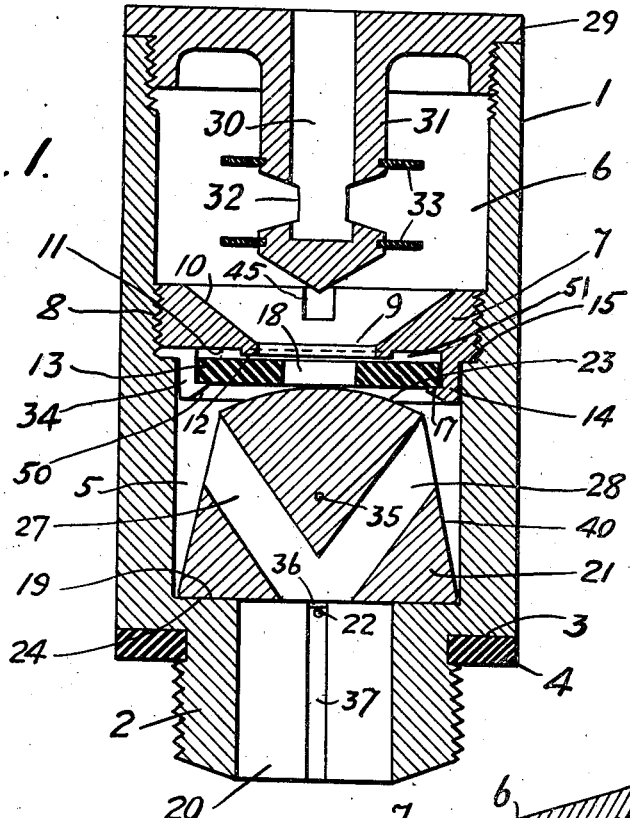
Fig. 1 is a view in vertical cross-section showing the vent plug in normal position.

In the drawing, I represents the vent plug generally which is preferably cylindrical in shape and is provided with a depending, cylindrical projection 2 externally threaded for engagement with the internal threads of an appropriate vent opening in the cover of a storage battery cell (not shown). A shoulder 3 is provided to which is applied a soft rubber gasket 4 to provide an air-tight seal between the vent plug and the cell cover.

The vent plug is hollow, having a lower cylindrical chamber 5 and an upper cylindrical chamber 6 separated by an annular partition member 7 whose external threads 8 engage corresponding threads on the internal wall of the vent plug. The partition member 7 is provided with an axial orifice 9 providing communication between the lower chamber 5 and the upper chamber 6 of the vent plug. The upper surface of the partition member 7 is conical as at 10, while the lower surface lies in a horizontal plane as at 11, and is provided with a lip or boss 12 surrounding the opening 9 and forming an abutment for the pliable valve seat 13. The partition member 7 is provided with a shoulder which seats on the shoulder 15 of the internal wall of the vent plug and is also provided with a depending skirt 14 having an inturned ledge 17 which supports the pliable valve seat 13 normally out of contact with the lip 12. Skirt 14 has its lower inner surface beveled as seen at 50 to provide clearance for the valve member hereinafter mentioned. The valve seat 13 has an axial orifice 18 confronting the orifice 9 in the partition member 7. Recesses 45 are provided at diametrically opposite points in the conical surface of the partition 7 to facilitate inserting and removing this member by means of a suitable tool such as a screw driver.

The lower chamber 5 is provided with an internal horizontal shoulder 19 surrounding the cylindrical passage 20 passing through the depending projection 2 and thus providing communication with the interior of the cell when the vent plug is in the cell cover.

The vent plug is surmounted by a cap 29 closing the top of the upper chamber 6 except for the vent duct 30 in the depending vent tube 31, having horizontal passages 32 leading from the vent duct 30 into the chamber 6. The vent duct 30 is closed at the bottom and spray baffles 33 are provided above and below the horizontal passages 32.

Within the lower chamber 5 is located the valve member 21. This valve member is bounded by a lower plane surface 24 and by an upper spherical surface 23 with an annular, conically shaped surface 40 between them. In the normal position of the valve member, the plane surface 24 rests on the shoulder 19 and its periphery closely fits the internal cylindrical wall of the chamber 5, allowing just enough clearance to permit the valve member to tilt into the position shown in Fig. 2 when the vent plug is tilted through a sufficient angle. It is not absolutely necessary that the upper surface of the shoulder 19 and the lower surface of the valve member 21 should be exactly plane. They might be slightly conical and still give satisfactory results. When the valve member tilts about its periphery on the cylindrical wall of the chamber 5 as a result of the tilting of the plug, the spherical surface 23 comes into contact with the lower surface of the valve seat 13 and closes the orifice 18 as shown in Fig. 2. The spherical upper surface 23 has its center located at 22 in the axis of the valve member slightly below its base, so that its travel, when the valve member is tilted from the position shown in Fig. 1 to that shown in Fig. 2, will be substantially in the vertical axis of the plug, so that whatever portion of the upper spherical surface comes in contact with the pliable valve seat 13 it will completely close the opening 18. The center of gravity of the valve member is indicated at the point 35 which, by reason of the design of the valve member, is displaced by an appreciable distance from the center 22 of the spherical surface.

It will be noted that, as the plug is tilted from the vertical position to a position where the valve member begins to tilt about the point of contact 41 between its periphery and the cylindrical wall of the chamber 5, the force of gravity tending to tilt the valve member will be in a vertical line passing through the center of gravity as illustrated by the line 42 in Fig. 2. The gravitational moment tending to tilt the valve member and cause it to close the orifice 18 in the valve seat 13 will therefore be the product of the weight of the valve member and the distance between the line 42 and the point of contact 41, this distance or lever arm being represented by the line 44 in Fig. 2. It is evident, therefore, that the greater the distance between the center of gravity 35 and the base of the valve member, the greater will be the lever arm 44 and the resultant gravitational moment which forces the valve member against the valve seat 13. The design of the valve member herein disclosed is adapted to provide the maximum distance between the point 35 and the base of the valve member with given dimensions of the plug. This feature is of importance where available space for the plug is limited and certain dimensions cannot be exceeded.

Two cylindrical ducts 27 and 28 are provided extending from the base to the external conical surface of the valve member.

Figure 2:
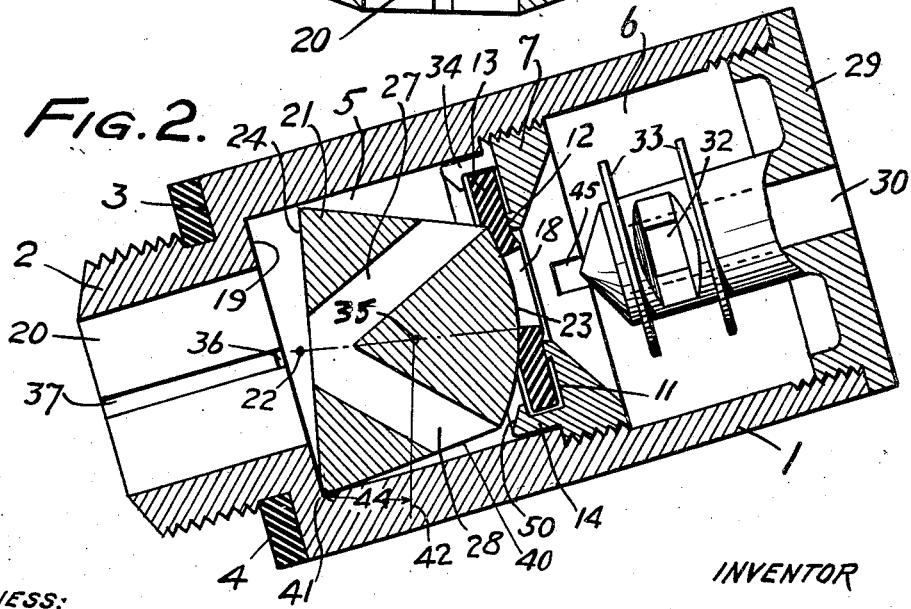
Fig. 2 is a view with parts broken away in longitudinal cross-section showing the vent plug in tilted position.

In the normal upright position of the vent plug, seen in Fig. 1, there is provided a passage for the escape of gas from the cell through the duct 20, the ducts 27 and 28 in the valve member and the openings 18 and 9 in the valve seat and the partition member into the upper chamber 6 and from there through orifice 32 and vent duct 30 into the atmosphere. When the cell is tilted through a sufficient angle, the valve member 21 will tilt into the position shown in Fig. 2, closing the orifice 18 and bringing the valve seat 13 against the annular lip 12 so as to close the passage between the chamber 6 and the chamber 5 and prevent the escape of liquid from the cell.

The depending skirt 14 is provided with a number of radial openings or slots 34. The object of these slots is to provide a path for draining back any liquid which may collect in the chamber 6, whether by failure of the valve member to close the opening 18 completely or by reason of the trapping or spray from the cell during the gassing period of charge. Since there is usually a certain amount of gas developed in a storage cell even when standing idle, it is necessary to provide for the drainage of this trapped liquid against the escape of gas bubbles through the opening 18. This is provided for by the space between the disk 13 and the underside of the partition 7, which space communicates with the slots 34, allowing the trapped liquid to pass down around the valve member 21 while the gas bubbles are escaping through the orifices 27 and 28 in the valve member and through the opening 18 in the disk 13. To further provide for this drainage of trapped liquid, one or more capillary grooves are provided in the upper surface of the shoulder 19 as indicated at 36. The groove 36 is continued as a vertical groove 37 in the cylindrical wall of the passage 20. It will thus be seen that there is provided a substantially continuous capillary path for the drainage of trapped liquid from the chamber 6 via the space 51, groove 34, the restricted space between the valve member 21 and the cylindrical wall surrounding it, the grooves 36 and 37, while gas is free to escape from the cell through the various ducts and passages already described.

The valve member 21 should preferably be made of relatively heavy material such as lead-antimony alloy.

The baffle plates 33 surrounding the vent tube 31 above and below the openings 32 prevent any liquid trapped in the chamber 6 from flowing across the openings 32 in the various positions of the plug in service where this liquid might be ejected through the duct 30 by any gas escaping from the cell.

I do not intend to be limited save as the scope of the prior art and of the attached claim may require.

I claim:

In a non spill vent plug, cylindrical walls defining a chamber, a perforated valve seat supported above the chamber, an inwardly projecting support at the bottom of the chamber and a valve member bounded by a flattened base normally resting on the support and whose periphery closely fits the internal cylindrical wall of the chamber, and by an upper spherical surface confronting the perforation in the valve seat, the center of said spherical surface lying in the axis of the valve member closely adjacent to the plane of the periphery of the flattened base, and by a conically shaped annular surface between the spherical surface and the base, said valve member adapted upon tilting of the plug in any direction through a sufficient angle from the vertical to rock about the point of contact between the periphery of the base and the cylindrical wall of the chamber to cause the center of the spherical surface to travel substantially in the axis of the cylindrical wall to bring said spherical surface in contact simultaneously with all points in the periphery of the perforation of the valve seat.

J. LESTER WOODBRIDGE.